(12) United States Patent
Celik

(10) Patent No.: US 11,027,578 B2
(45) Date of Patent: Jun. 8, 2021

(54) WHEEL AND TIRE ASSEMBLY

(71) Applicant: The Goodyear Tire & Rubber Company, Akron, OH (US)

(72) Inventor: Ceyhan Celik, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 440 days.

(21) Appl. No.: 15/904,833

(22) Filed: Feb. 26, 2018

(65) Prior Publication Data
US 2019/0263178 A1    Aug. 29, 2019

(51) Int. Cl.
*B60C 7/12*    (2006.01)
*B60C 7/24*    (2006.01)
*B60C 7/10*    (2006.01)
*B32B 3/12*    (2006.01)

(52) U.S. Cl.
CPC ............. *B60C 7/125* (2013.01); *B60C 7/24* (2013.01); *B32B 3/12* (2013.01); *B60C 2007/107* (2013.01)

(58) Field of Classification Search
CPC .......... B60C 19/00; B60C 7/12; B60C 7/125; B60C 2007/107; B60C 7/24; B32B 3/12
See application file for complete search history.

(56) References Cited

U.S. PATENT DOCUMENTS

| | | | | |
|---|---|---|---|---|
| 1,643,848 | A | * | 9/1927 | Hibbert ................. B29D 30/02 156/113 |
| 2,070,066 | A | * | 2/1937 | Picardi ..................... B60C 5/20 152/331.1 |
| 3,042,278 | A | | 7/1960 | McCullough |
| 3,288,353 | A | | 11/1966 | McCullough |
| 3,769,145 | A | | 10/1973 | Gresham |
| 4,869,939 | A | | 9/1989 | Santo |
| 5,176,765 | A | | 1/1993 | Yamaguchi |
| 5,201,971 | A | * | 4/1993 | Gifford ..................... B60C 9/18 152/526 |
| 5,494,090 | A | * | 2/1996 | Kejha ..................... B60C 7/12 152/310 |
| 5,685,926 | A | * | 11/1997 | Kejha ..................... B60C 7/12 152/157 |
| 5,873,464 | A | | 2/1999 | Haley |
| 5,921,115 | A | | 7/1999 | Winner |

(Continued)

FOREIGN PATENT DOCUMENTS

JP     2004066854 A  *  3/2004  ........... B60C 17/061

OTHER PUBLICATIONS

Evolution of Meso-Structures for Non-Pneumatic Tire Development: A Case Study, Proceedings of the ASME 2014 International Design Engineering Technical Conferences and Computers and Information in Engineering Conference, DETC2014-34184, Fazelpour, et al., pp. 1-11.

*Primary Examiner* — Scott A Browne
(74) *Attorney, Agent, or Firm* — Robert N. Lipcsik

(57) ABSTRACT

A wheel and tire assembly includes a plurality of support elements for supporting part of a load of a vehicle and an annular shear band extending circumferentially around the support elements. The band has a radially inner circumferential membrane, a radially outer circumferential membrane, and a shear layer interconnecting the inner membrane and the outer membrane. The shear layer has a plurality of closed cells for controlling shear deflection between the inner membrane and the outer membrane.

19 Claims, 2 Drawing Sheets

(56) References Cited

U.S. PATENT DOCUMENTS

| | | | |
|---|---|---|---|
| 6,050,648 A * | 4/2000 | Keleny | A63C 17/223 |
| | | | 152/323 |
| 6,769,465 B2 * | 8/2004 | Rhyne | B60C 9/18 |
| | | | 152/197 |
| 7,316,252 B1 | 1/2008 | Heard | |
| 7,418,988 B2 | 9/2008 | Cron | |
| 7,685,798 B2 | 3/2010 | Marzocchi | |
| 8,215,351 B2 | 7/2012 | Thompson | |
| 8,517,068 B2 | 8/2013 | Delfino | |
| 8,609,220 B2 | 12/2013 | Summers | |
| 8,651,156 B2 | 2/2014 | Fadel | |
| 8,807,181 B2 | 8/2014 | Toyoda | |
| 8,962,120 B2 | 2/2015 | Delfino | |
| 8,999,480 B2 | 4/2015 | Summers | |
| 9,156,313 B2 | 10/2015 | Thompson | |
| 9,272,576 B2 | 3/2016 | Dotson | |
| 9,321,312 B2 | 4/2016 | Asper | |
| 9,346,317 B2 | 5/2016 | Dotson | |
| 9,421,820 B2 | 8/2016 | Wilson | |
| 9,440,494 B2 | 9/2016 | Asper | |
| 9,487,052 B1 | 11/2016 | Asper | |
| 9,493,045 B2 | 11/2016 | Cron | |
| 9,834,040 B2 | 12/2017 | Benzing | |
| 9,849,721 B2 | 12/2017 | Benzing | |
| 2002/0150730 A1 | 10/2002 | Luca | |
| 2008/0303338 A1 * | 12/2008 | Takeda | B60B 7/14 |
| | | | 301/104 |
| 2011/0030866 A1 * | 2/2011 | Fadel | B60C 7/18 |
| | | | 152/311 |
| 2012/0291935 A1 * | 11/2012 | Kuo | B60C 19/122 |
| | | | 152/502 |
| 2013/0101821 A1 * | 4/2013 | Jeon | C08L 71/00 |
| | | | 428/215 |
| 2013/0240272 A1 * | 9/2013 | Gass | B60C 7/105 |
| | | | 180/54.1 |
| 2013/0269851 A1 * | 10/2013 | Incavo | B60C 19/122 |
| | | | 152/510 |

* cited by examiner

WHEEL AND TIRE ASSEMBLY

FIELD OF THE INVENTION

The present invention relates to laminated products or products made of several layers or bands of planar or non-planar form, which are joined together, for example of the cellular type. The present invention relates, more particularly, to resilient (flexible) wheels and tires for motor vehicles.

BACKGROUND OF THE PRESENT INVENTION

Conventional non-pneumatic tires, when associated with any rigid mechanical element intended to provide a connection between the non-pneumatic tire and a wheel, have in some cases replaced the pneumatic tire, rim and disc utilized with many vehicles.

One conventional non-pneumatic tire may be structurally supported without pressurized gas. The non-pneumatic tire may include a reinforced annular band supporting the load on the tire and a plurality of support elements or spokes having relatively low stiffness in compression and operate in tension to transmit forces between the annular band and a wheel of to vehicle.

Such an annular band, or shear band, may include two membranes formed from essentially inextensible cords coated with natural or synthetic rubber. The membranes may be separated by a shear layer itself made of rubber. The operating principle of such a shear band may be that a shear modulus of the shear layer may be substantially lower than a tensile modulus of the two membranes. The shear layer may be sufficient, however, to correctly transmit forces from one membrane to the other membrane thus allowing the shear band to work in a shear mode.

The conventional shear band thereby operate in severe or harsh conditions with essentially no risk of puncture and without any pressure maintenance requirement. However, may have a non-uniform. Moreover, compared with the non-pneumatic tires of the prior art, a ground contact pressure which is more uniformly distributed, hence better working of the tire, an improved road holding and improved wear resistance are obtained here.

However, such a rubber shear band is not without drawbacks.

Firstly, at the customary operating temperatures, for example between −30° C. and +40° C., it is relatively hysteretic, that is to say that some of the energy supplied for rolling is dissipated (lost) in the form of heat. Next, for significantly lower operating temperatures, such as those that can be found, for example in geographical areas of polar type, typically below −50° C. or even less, it is well known that rubber rapidly becomes brittle, frangible and therefore unusable. Under such extreme conditions, it is moreover understood that temperature fluctuations that are more or less sizable and rapid, combined, for example, with relatively high mechanical stresses, could also lead to adhesion problems between the two membranes and the shear layer, with a risk of localized buckling of the shear band level with the membranes and endurance that is in the end degraded.

SUMMARY OF THE INVENTION

A wheel and tire assembly in accordance with the present invention includes a plurality of support elements for supporting part of a load of a vehicle and an annular shear band extending circumferentially around the support elements. The band has a radially inner circumferential membrane, a radially outer circumferential membrane, and a shear layer interconnecting the inner membrane and the outer membrane. The shear layer has a plurality of closed cells for controlling shear deflection between the inner membrane and the outer membrane.

According to another aspect of the wheel and tire assembly, the shear layer is constructed of a bubble-wrap material.

According to still another aspect of the wheel and tire assembly, the shear layer forms a honeycomb structure.

According to yet another aspect of the wheel and tire assembly, the shear layer is constructed of a high-performance polymer which adheres to a rubber compound coating of the inner membrane and the outer membrane.

According to still another aspect of the wheel and tire assembly, bubbles of the shear layer contain a filler to strengthen the bubbles.

According to yet another aspect of the wheel and tire assembly, the shear band is secured to the support elements by heat sealing.

According to still another aspect of the wheel and tire assembly, the shear band is secured to the support elements by adhesive.

According to yet another aspect of the wheel and tire assembly, the shear band is secured to the support elements by resorcinol-formaldehyde-latex.

According to still another aspect of the wheel and tire assembly, the shear layer is secured to the support elements by resorcinol-formaldehyde-latex.

According to yet another aspect of the wheel and tire assembly, the shear layer is constructed from polyethylene terephthalate.

A non-pneumatic wheel and tire assembly in accordance with the present invention includes a hub member secured to a vehicle, a plurality of support elements secured to the hub member for supporting part of a load of the vehicle, and an annular shear band extending circumferentially around the support elements. The band has a radially inner circumferential membrane, a radially outer circumferential membrane, and a shear layer interconnecting the inner membrane and the outer membrane. The shear layer has a plurality of closed cells for controlling shear deflection between the inner membrane and the outer membrane.

According to another aspect of the non-pneumatic wheel and tire assembly, the inner membrane moves in shear relative to the outer membrane under tensile, flexural, and compressive stresses incurred by the structure during rotation of the assembly under a load.

According to still another aspect of the non-pneumatic wheel and tire assembly, the shear layer only deforms elastically under a load.

According to yet another aspect of the non-pneumatic wheel and tire assembly, the inner membrane and the outer membrane only deform elastically under a load.

According to still another aspect of the non-pneumatic wheel and tire assembly, the inner and outer membranes are constructed of a metal material.

According to yet another aspect of the non-pneumatic wheel and tire assembly, the inner and outer membranes are constructed of a polymer material.

According to still another aspect of the non-pneumatic wheel and tire assembly, the inner and outer membranes are constructed of a fabric material.

According to yet another aspect of the non-pneumatic wheel and tire assembly, the inner and outer membranes are constructed of wrapped metals cords.

According to still another aspect of the non-pneumatic wheel and tire assembly, the inner and outer membranes are constructed of wrapped organic cords.

According to another aspect of the non-pneumatic wheel and tire assembly, the inner and outer membranes are constructed such that the membranes have a maximum tensile strength in the circumferential direction of the assembly.

DEFINITIONS

The following definitions are controlling for this patent application.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inward" directionally means toward the tire cavity.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-pneumatic" means a lack of pressurized inflation gases, such as air, in order to assume a functional or usable form.

"Outward" directionally means in a direction away from the tire cavity.

"Radial" and "radially" means directions radially toward or away from the axis of rotation of the tire.

"Tread element" or "traction element" means a rib or a block element defined by having a shape adjacent grooves.

BRIEF DESCRIPTION OF THE DRAWINGS

A detailed description and examples of the present invention are presented in connection with the figures relating to these examples, which schematically show (without a specific scale).

DETAILED DESCRIPTION OF EXAMPLES OF THE PRESENT INVENTION

Figure 1:
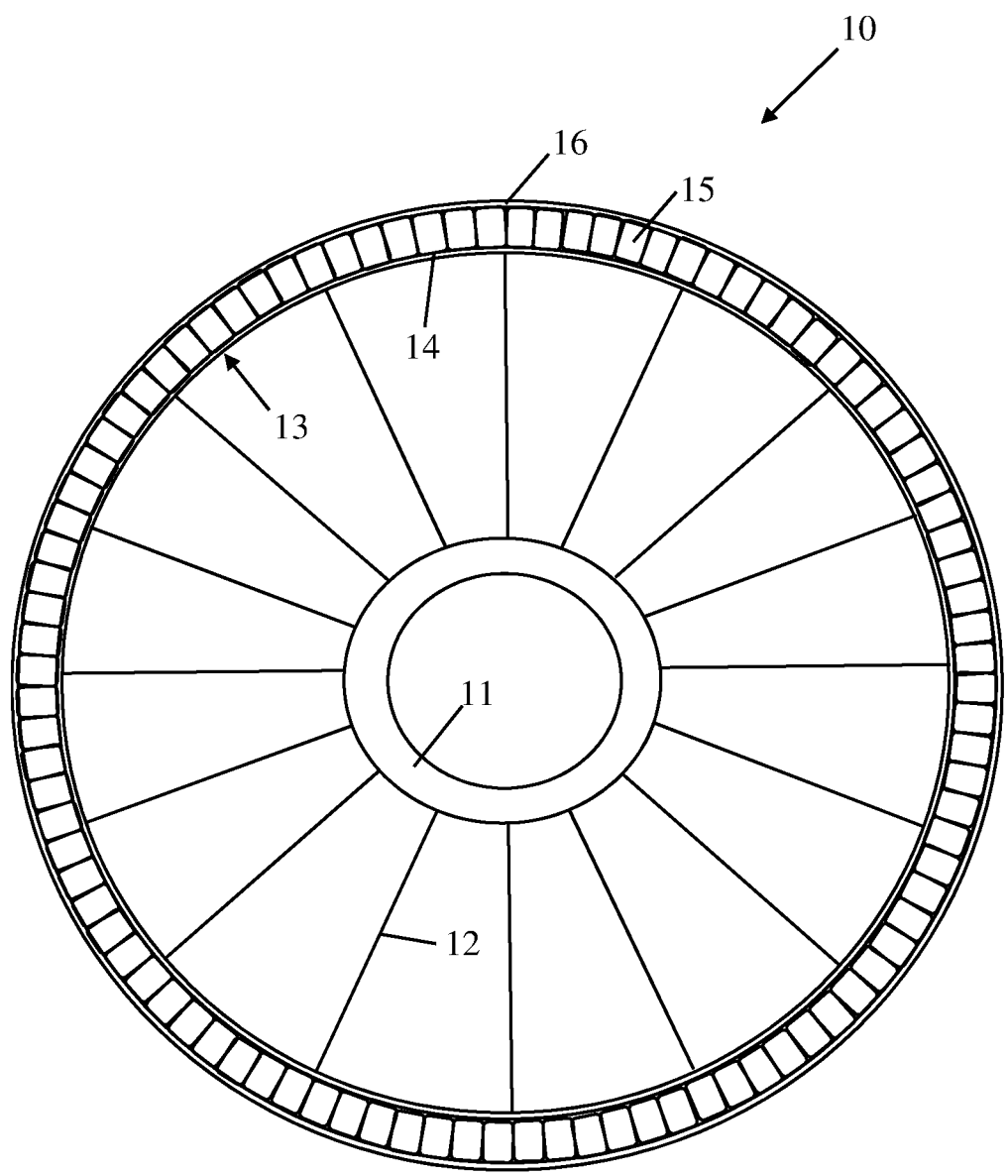
FIG. 1 schematically shows a side view of a wheel and tire assembly in accordance with the present invention.
Figure 2:
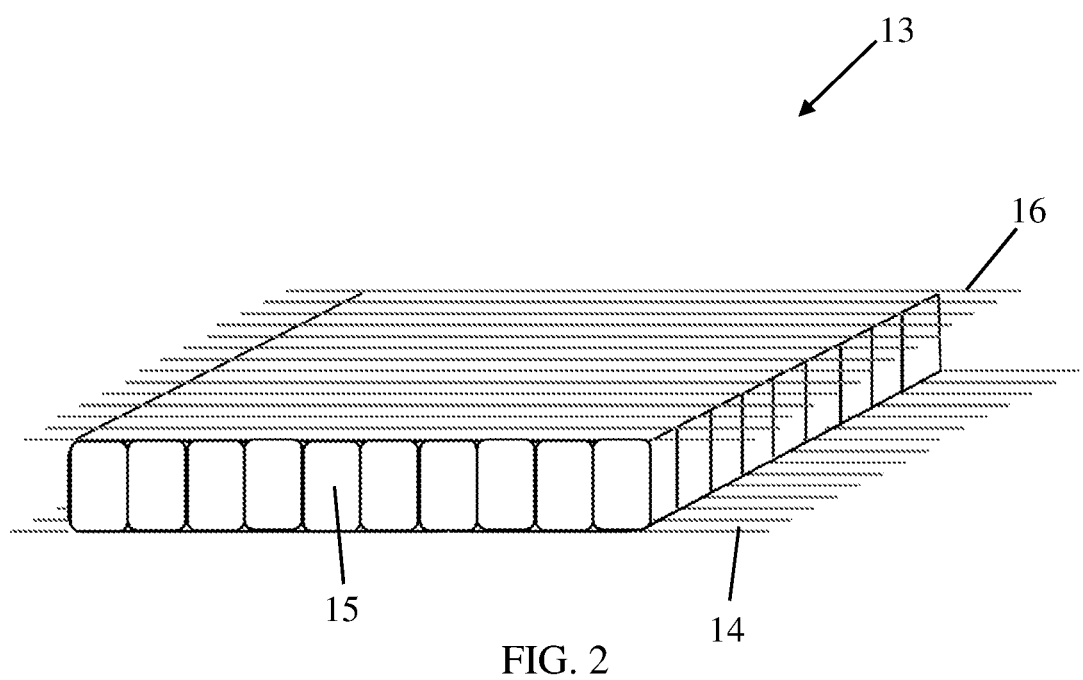
FIG. 2 schematically shows part of one constituent component of the assembly of FIG. 1.

By way of example, FIGS. 1 and 2 schematically represents a side view (e.g., in a plane perpendicular to the axis of rotation) of a pneumatic or a non-pneumatic resilient wheel and tire assembly 10 structurally supported (e.g., by a load-bearing structure), by a circumferential shear band 13 of which comprises by a "bubble wrap" or inflated closed-cell cushion or product.

The example assembly 10 may comprise a hub 11, an annular band referred to as a shear band 13 comprising at least one inner circumferential membrane 14 and one outer circumferential membrane 16 that are oriented in the circumferential direction, and a plurality of support elements or spokes 12 that connect the hub 11 to the inner circumferential membrane 14. The two membranes 14, 16 may be interconnected by a layer of closed cells or a "bubble-wrap" layer 15.

The shear band 13 of the assembly 10 in accordance with the present invention may thus form a honeycombed-like structure that may be described as "cellular" in the sense that no other material is necessary (as illustrated in FIG. 1) between the two membranes 14, 16 and the layer 15. The bubble-wrap layer 15 may be a commercially available product or designed specifically for non-pneumatic assemble 10 or a pneumatic assembly. The bubble-wrap layer 15 may be constructed of a high-performance polymer, such as nylon, polyethylene terephthalate (PET), liquid crystal polymer (LCP), etc., which may adhere to a rubber compound coating the membranes 14, 16 (e.g., a ply) and provide radial reinforcement between the membranes. Further, the bubbles may contain a filler, such as styro-foam or other polymers, to strengthens the bubbles.

The shear band 13 may be held together and secured to the spokes 12 by heat sealing, by adhesive binding and/or by other suitable means. Bubble wrap materials may be made from suitable laminated sheet plastic, such as polyethylene terephthalate. Other similar flexible coverings, such as vinyl and/or leather, may be used in dispose the bubble-wrap on the two membranes 14, 16.

One example adhesive may be RFL (resorcinol-formaldehyde-latex). An RFL adhesive may include a polymer latex which may be based on natural rubber, styrene-butadiene rubber, acrylonitrile-butadiene rubber (NBR), hydrogenated acrylonitrile-butadiene rubber (HNBR) and vinyl pyridine. An optional ingredient to the RFL may be an isocyanate compound. Additional examples of suitable adhesives may be polyvinyl acetate, polyacrylic, polyvinyl chloride and polyurethane. Cement solutions (organic) of polymers may also be used as an adhesive. Representative polymers may include natural rubber, polychloroprene, acrylonitrile-butadiene copolymers, polyisoprene, zinc salts of unsaturated carboxylic acid ester grafted hydrogenated nitrile butadiene elastomers, styrene-butadiene rubbers, polybutadiene, EPDM, hydrogenated acrylonitrile-butadiene copolymers, polyurethane and ethylene-acrylic elastomers.

The adhesive may be first applied to the membranes 14, 16 and the bubble-wrap layer 15 may be thereafter applied. The adhesive may be applied to the membranes 14, 16 either before or after being adhered to the bubble-wrap layer 15.

There may be many methods for applying adhesive. The adhesive may be applied with a knife, reverse roll or roll-over-platform coaters. Engraved rolls, spray applicators, and/or rotary screen printers may also be used. Other examples may include silk-screen, dipping, brushing, and/or spraying. The thickness of the adhesive may vary, such as from about 0.05 mm to about 1.0 mm, or from 0.05 mm to 0.40 mm.

The bubble-wrap layer 15 may be applied to the plies or membranes 14, 16 and thereafter applied to the membranes 14, 16. The bubble-wrap layer 15 may be applied to an adhesive-coated surface either mechanically, electrostatically, and/or by means of a combination of both techniques.

While present exemplary examples of the present invention and methods of practicing the same have been illustrated and described, it will be recognized that this invention may be otherwise variously embodied and practiced within the scope of the following claims. Other similar flexible coverings, such as vinyl and/or leather, may be used with the bubble-wrap on the two membranes 14, 16.

This bubble wrap layer or deformable cellular structure 15, used as a non-planar elastic beam, may exhibit a high resistance to flexural/compressive stresses and a high endurance to alternated stresses or cyclic-loading. The structure 15 may generate a deformation comparable to shear between its two membranes 14, 16 under the action of various tensile, flexural and/or compressive stresses incurred by the structure during rotation of the assembly 10 under load. The annular shear band may thus have a high deformation potential in a purely elastic domain. The structure 15 may be durable and exhibit purely elastic behavior up to rupture. This property may also apply to the membranes 14, 16 when the membranes are themselves made from a composite material (e.g., fibers/resin). Compared with a metal shear band, the shear band 13 may be more durable, substantially lighter, and/or corrosion resistant.

The two membranes 14, 16 may alternatively be constructed of a material other than that of the structure 15, such as metal, polymer, fabric, wrapped cord, etc. The membranes 14,16 themselves may thereby be composites comprising fibers embedded in a resin or rubber matrix. Thus, the whole of the annular shear band 13, constituted by the two membranes 14, 16 and the structure 15, may be constructed of a composite material. Further, fibers/wires of the membranes 14, 16 may be continuous, unidirectional, and/or oriented parallel to the circumferential direction so that the membranes have a maximum tensile strength in the circumferential direction.

The assembly 10 of the present invention may be used in all types of land based or non-land based vehicles and, in particular, vehicles intended to face severe or harsh rolling conditions or extreme temperatures, such as those which could be encountered, for example, by lunar rover vehicles, road transport vehicles, off-road vehicles and/or any other type of transport or handling vehicles.

Variations in the present invention are possible in light of the description of examples of it provided herein. While certain representative examples and details have been shown for the purpose of illustrating the present invention, it will be apparent to those skilled in this art that various changes and modifications may be made therein without departing from the scope of the present invention. It is, therefore, to be understood that changes may be made in the examples described which will be within the full intended scope of the present invention as defined by the following appended claims.

What is claimed:

1. A wheel and tire assembly comprising:
a plurality of support elements that define an axial end face of the wheel and tire assembly for supporting part of a load of a vehicle; and
an annular shear band extending circumferentially around the support elements, the band having a radially inner circumferential membrane, a radially outer circumferential membrane, and a shear layer interconnecting the inner membrane and the outer membrane, the shear layer having a plurality of transversely adjacent closed cells for controlling shear deflection between the inner membrane and the outer membrane, the closed cells forming a honeycombed structure with each cell extending radially and entirely between the inner membrane and the outer membrane in the sense that no other closed cells are present radially between the inner membrane and the outer membrane, the shear layer being constructed of nylon adhering to a rubber compound coating of the inner membrane and the outer membrane thereby radially reinforcing the inner and outer membranes with the closed cells being filled with styro-foam.

2. The wheel and tire assembly set forth in claim 1 wherein the shear layer is constructed of a bubble-wrap material.

3. The wheel and tire assembly set forth in claim 1 wherein the shear layer is constructed of a polymer which adheres to the rubber compound coating the inner membrane and the outer membrane.

4. The wheel and tire assembly set forth in claim 1 wherein the closed cells of the shear layer contain a filler to strengthens the bubbles.

5. The wheel and tire assembly set forth in claim 1 wherein the shear band is secured to the support elements by heat sealing.

6. The wheel and tire assembly set forth in claim 1 wherein the shear band is secured to the support elements by adhesive.

7. The wheel and tire assembly set forth in claim 1 wherein the shear band is secured to the support elements by resorcinol-formaldehyde-latex.

8. The wheel and tire assembly set forth in claim 1 wherein the shear layer is secured to the inner and outer membranes by resorcinol-formaldehyde-latex.

9. The wheel and tire assembly set forth in claim 1 wherein the shear layer is constructed from polyethylene terephthalate.

10. A non-pneumatic wheel and tire assembly comprising:
a hub member secured to a vehicle;
a plurality of support elements that define an axial end face of the wheel and tire assembly secured to the hub member for supporting part of a load of the vehicle; and
an annular shear band extending circumferentially around the support elements, the band having a radially inner circumferential membrane, a radially outer circumferential membrane, and a shear layer interconnecting the inner membrane and the outer membrane, the shear layer having a plurality of transversely adjacent closed cells for controlling shear deflection between the inner membrane and the outer membrane, the closed cells forming a honeycombed structure with each cell extending radially and entirely between the inner membrane and the outer membrane in the sense that no other closed cells are present radially between the inner membrane and the outer membrane, the shear layer being constructed of nylon adhering to a rubber compound coating of the inner membrane and the outer membrane thereby radially reinforcing the inner and outer membranes with the closed cells being filled with styro-foam.

11. The non-pneumatic wheel and tire assembly set forth in claim 10 wherein the inner membrane moves in shear relative to the outer membrane under tensile, flexural, and compressive stresses incurred by the structure during rotation of the assembly under a load.

12. The non-pneumatic wheel and tire assembly set forth in claim 10 wherein the shear layer only deforms elastically under a load.

13. The non-pneumatic wheel and tire assembly set forth in claim 10 wherein the inner membrane and the outer membrane only deform elastically under a load.

14. The non-pneumatic wheel and tire assembly set forth in claim 10 wherein the inner and outer membranes are constructed of a metal material.

15. The non-pneumatic wheel and tire assembly set forth in claim 10 wherein the inner and outer membranes are constructed of a polymer material.

16. The non-pneumatic wheel and tire assembly set forth in claim 10 wherein the inner and outer membranes are constructed of a fabric material.

17. The non-pneumatic wheel and tire assembly set forth in claim 10 wherein the inner and outer membranes are constructed of twisted metals cords.

18. The non-pneumatic wheel and tire assembly set forth in claim 10 wherein the inner and outer membranes are constructed of twisted organic cords.

19. The non-pneumatic wheel and tire assembly set forth in claim 10 wherein the inner and outer membranes are constructed such that the membranes have a maximum tensile strength in the circumferential direction of the assembly.

* * * * *